June 14, 1938.   C. E. MENSING   2,120,256
PROCESS AND APPARATUS FOR GAS AND LIQUID CONTACTS
Filed March 13, 1935   4 Sheets-Sheet 1

Inventor
Carl E. Mensing,
By Wm. P. Spielman
Attorney

June 14, 1938.  C. E. MENSING  2,120,256
PROCESS AND APPARATUS FOR GAS AND LIQUID CONTACTS
Filed March 13, 1935  4 Sheets-Sheet 2

Inventor
Carl E. Mensing,
By Wm. P. Spielman
Attorney

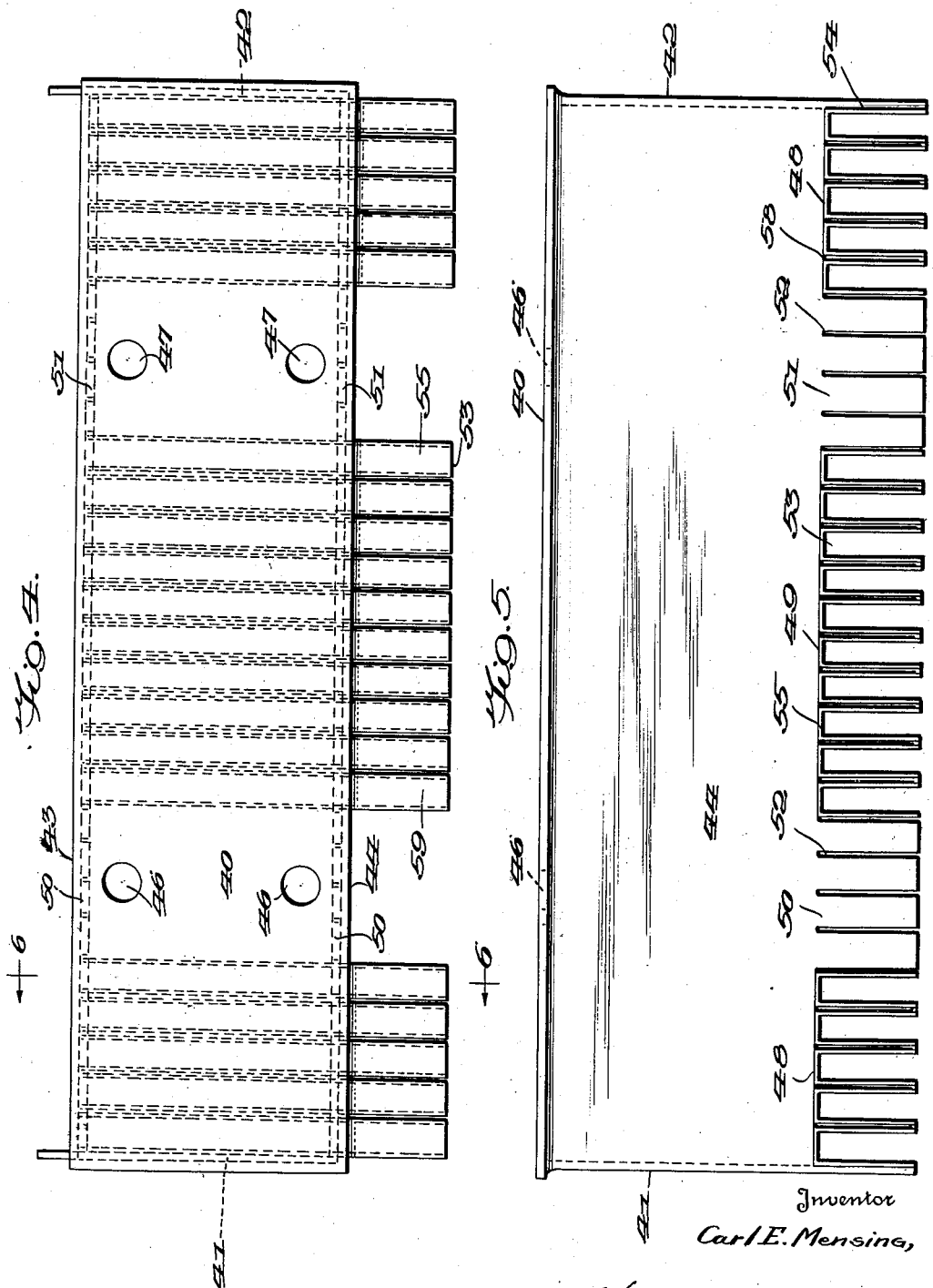

June 14, 1938.  C. E. MENSING  2,120,256
PROCESS AND APPARATUS FOR GAS AND LIQUID CONTACTS
Filed March 13, 1935  4 Sheets-Sheet 4
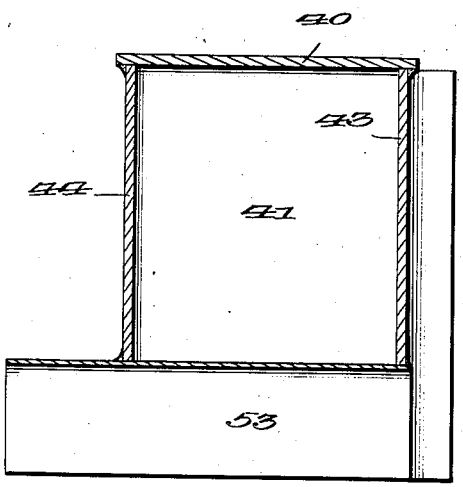
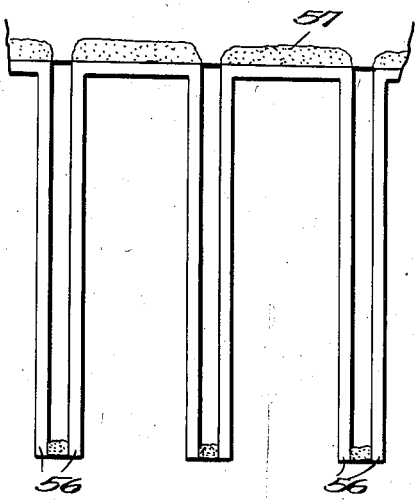
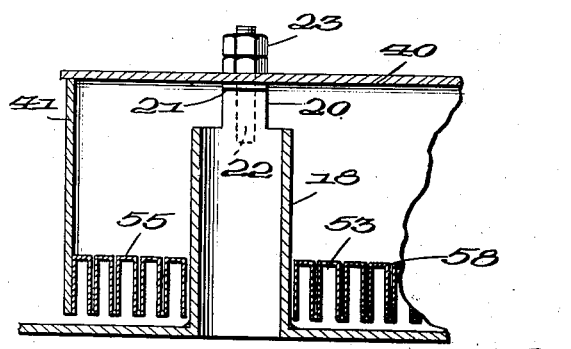
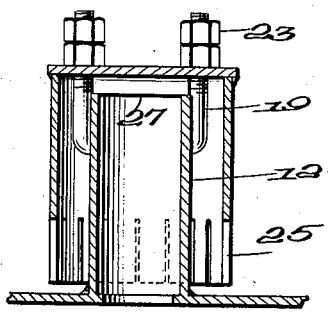
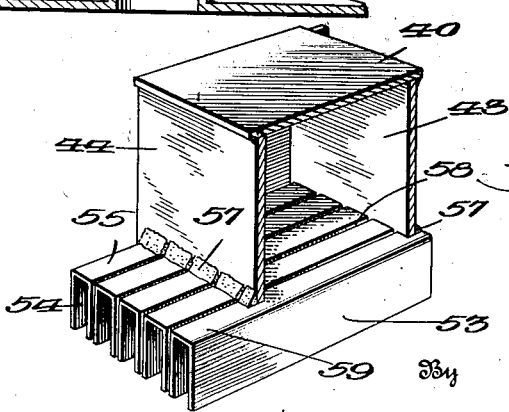
Inventor
Carl E. Mensing,
By Wm. P. Spielman
Attorney Patented June 14, 1938

2,120,256

UNITED STATES PATENT OFFICE 2,120,256

PROCESS AND APPARATUS FOR GAS AND LIQUID CONTACT

Carl E. Mensing, Somerville, N. J., assignor to Calco Chemical Company, New York, N. Y., a corporation of Delaware Application March 13, 1935, Serial No. 10,921

19 Claims. (Cl. 261—114)

This invention relates to a process and apparatus for effecting intimate contact between a gas or vapor and a body of liquid. More specifically, the invention relates to the construction and operation of bubble trays for towers used in fractionation, absorption, scrubbing, chemical reaction and similar processes which require a satisfactory contact of gas and liquid for successful operation.

Processes of this type are usually carried out in towers consisting of a relatively large number of superimposed plates or trays supported by an outer shell, in which the gas or vapor passes upwardly from the base of the tower through risers or nozzles in the trays and the absorbing liquid or condensate flows downwardly by gravity from tray to tray in countercurrent thereto.

In these processes the importance of a complete contact between all portions of the liquid on every tray and the gas rising through the tray has long been recognized, and many arrangements of bubble caps, baffles and inlet and outlet pipes have been proposed to facilitate such contact by obtaining an extended travel of the liquid over a large number of bubble caps on the face of the tray. In all cases however the force of gravity has been relied on to propel the liquid across the tray, and accordingly it has been impossible to pass a given portion of the liquid over any part of the tray surface more than once. For this reason the contact of liquid on a given tray with the gas rising therethrough has been limited by the number of bubble caps, and repeated contact between the liquid and the bubble caps has been impossible. It is an object of the present invention to obtain a more extended travel of the absorption liquid on the tray surface than can be obtained by gravitational force and to produce a path of travel which will permit, if desired, a repeated contact between the liquid and the bubble caps.

In some of the above mentioned processes, the only object sought is the alteration of characteristics of the gases rising through the tower and changes in the liquid on the plates are disregarded. In many cases, however, changes brought about in the liquid are as important as those produced in the gas, and in some processes, notably those involving absorption, the primary object is the production of a liquid having the greatest possible concentration of constituents taken from the gas. With bubble trays of the prior art the rate of absorption on any given tray has been influenced by the progressive change in the nature of the absorption liquid as it passes across the tray surface; in other words, with a single passage of liquid across the tray the liquid is necessarily richer in absorbed constituents on the exit side than it is on the side of entrance. A further object of the present invention is the provision of a tray for an absorption tower in which means are provided for continuous mixing of the liquid thereon, so that the liquid is of approximately the same concentration throughout its entire surface.

In the past little attention has been paid to the temperature characteristics of the liquid on the tray surface and temperature control within the tower has been obtained, if at all, only by heating or cooling the gases in the area between the trays. The difficulties in altering the temperature of a gas by direct contact with solid heating or cooling elements is well recognized, since high efficiency can only be obtained within a very limited range of gas speeds for any given installation. It is a still further object of the present invention to effect temperature regulation in a gas and liquid contact apparatus by applying or removing heat directly from the liquid on the tray surface which, when uniformly mixed in the above described manner, automatically produces a corresponding regulation of the temperature of the gases rising through the tower.

With the above and other objects in view, the present invention resides in the design and construction of a bubble tray for a gas and liquid contact apparatus in which a controlled re-circulation and mixing of the absorption liquid on the tray is obtained. In the more specific and preferred aspects of the invention this re-circulation is brought about by the kinetic energy of the gases themselves as they rise through the tower, impeller bubble caps of a special type being employed which will apply this energy to create and maintain a controlled movement of the liquid over the surface of the tray. By this means, the additional and highly important result is obtained that the speed of re-circulation of the liquid on the plate surface is a direct function of the speed of the gases rising through the tower, so that the same range of absorption efficiency is obtained on the tray through a wide range of variations in the amount of gas passed through the tower in a given time. In other words, the present invention renders the absorption efficiency of the tray to a large extent independent of variations in gas velocity, for when the gas speed is greater then the average re-circulation of liquid on the plate will also be greater. For the same reason, temperature conditions on the tray are rendered more nearly constant throughout a variation in gas speeds by the provisions of the present invention, for the increased speed of re-circulation will automatically result in the passage of a greater amount of liquid over the temperature regulating elements in a given period of time. This is highly important in cases where a chemical reaction accompanied by energy change takes place on the tray surface as, for example, in the absorption of oxides of nitrogen in water to produce nitric acid.

The invention will be more specifically described in conjunction with the accompanying drawings in which:

Fig. 2 is a horizontal section through a tower showing a bubble tray in plan view.

Fig. 3 is a vertical section on the line 3—3 of Fig. 2.

Figs. 4 and 5 are enlarged plan and elevation views of an impeller bubble cap.

Figs. 6 and 7 are sectional and perspective views of a section of the impeller cap, taken on the line 6—6 of Fig. 4.

Fig. 8 is an enlarged detail of a portion of the same.

Fig. 9 is a vertical section on the line 9—9 of Fig. 2, showing the bubble cap support.

Fig. 10 is an enlarged view of a portion of Fig. 3, showing the impeller bubble cap support.

Figure 1:
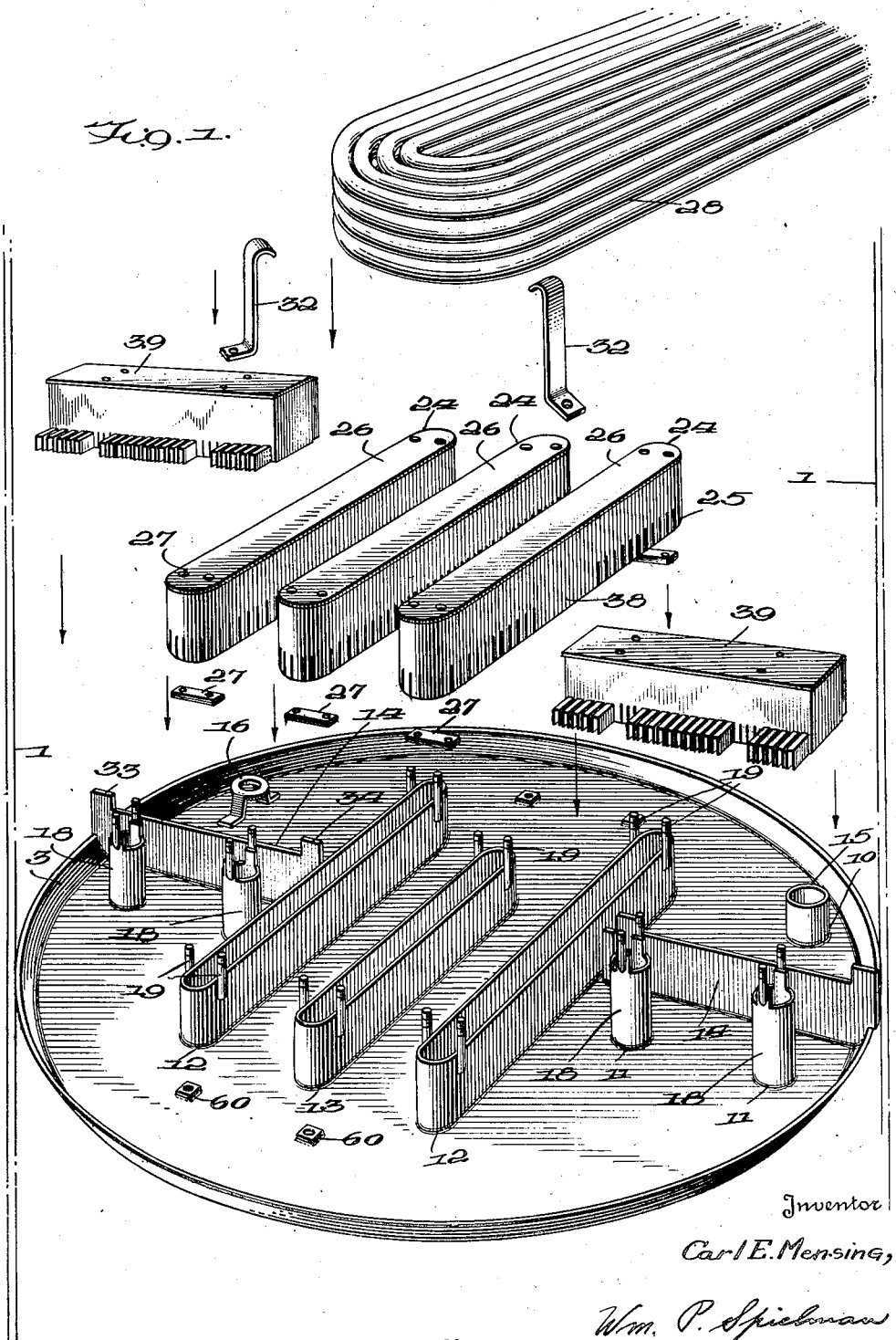
Fig. 1 is a disassembled perspective of a bubble tray and the equipment therefor, the tower walls being illustrated diagrammatically.

Referring to Figs. 1 and 2, the tower consists of a shell 1, preferably supplied with manholes 1a fitted with nozzles 6 and cover plates 6a. The tower is provided with a series of the plates or trays 2 of the present invention, which are preferably welded or otherwise sealed in the tower walls as at 3 and supported on crossbeams 4 affixed to angle irons 5 in the tower walls in such a way as to remain level. In the modification shown, the trays are preformed as single units and mounted during the construction of the tower, but it is understood that sectional trays of the type which can be inserted through the manholes may be employed if desired.

In selected areas of each tray, and preferably in the central zone thereof, outer apertures 7 and central apertures 8 are formed for the passage of gas therethrough. Supplemental apertures 9 for the same purpose are provided at a suitable distance from each end of the outer apertures 7 and in alignment therewith, and a similar passageway is formed at the rear of central aperture 8. Near the front wall of the tray, and at one side of the gas passages a circular orifice 10 is bored for the reception of an overflow outlet pipe, and apertures 11 for the reception of supplemental gas risers are provided on the median line of the tray for a purpose which will be subsequently described.

Attached to the tray surface by welding, rolling or otherwise are the permanent tray fittings, which are preferably inserted during the tower manufacture. These consist of elongated risers 12 and 13 surrounding the apertures 7 and 8 respectively, aligned dams 14 extending outwardly from the central zone of the plate at points adjacent the outer riser nozzles 12 and at right angles thereto and dividing the tray into front and rear sections, an overflow outlet pipe 15 fitting in the orifice 10, a bracket 16 for supporting an inlet pipe 17 (Fig. 3), both on the same side of the dams 14 in the front section of the tray, and supplemental riser nozzles 18 surrounding the apertures 11 on the opposite side of the dams in the rear section. The dams 14 are preferably formed at their inner ends with reinforcing flanges 14a, which extend at right angles thereto and brace the dams against the pressure of liquid passing thereover.

At each end of the elongated riser nozzles 12 and 13 are fastened, by welding or otherwise, pairs of threaded extensions 19, as shown in greater detail in Fig. 9, and adapted to receive nuts 23 for support of bubble caps placed thereon. The top of each of the supplemental risers 18 is formed into a pair of extensions 20, the upper surfaces of which form seats 21 for the support of the impeller bubble caps, and threaded extensions 22 similar to the extensions 19 are affixed thereto for the reception of the nuts 23 as shown in Fig. 10 of the drawings.

As has been explained, the above described tray fittings are preferably installed in the tower during its construction and are permanent in nature. The tray equipment, on the other hand, is of a type which can readily be inserted into or removed from the completed tower through the manholes 6, and is so mounted as to permit of ready adjustment. The individual elements are shown in perspective in Fig. 1, and their relative association with the permanent fittings already described is indicated by the directing arrows.

The bubble caps with which the tray is provided include a series of elongated main or central caps 24 corresponding in number with and fitting over risers 12 and 13. The sides of these caps are preferably constructed of sheet metal and provided with slots 25 in their lower edges as is customary, to divide the gas escaping therefrom into a large number of fine streams and so promote its contact with the liquid on the tray. The outer sides of the outer bubble caps, however, have blank sections 38 designed to fit adjacent the dams 14, in which these slots 25 are omitted. Each cap is provided with a preferably flat top 26 which is of sheet metal and welded to the sides, and in which holes are bored to receive the threaded projections 19 as has been described.

Suitable spacing of the caps from the tops of the riser nozzles and adjustment of the depth of each cap in the plate liquid is obtained by the provision of apertured shims 27, which also fit over the projections 19 and are placed between the upper edges of the riser nozzles and the tops 26 of the bubble caps. By the use of shims of proper thickness, any desired adjustment of the height of the bubble cap may be obtained. It is understood that the size and number of the riser nozzles 12 and 13 and their corresponding bubble caps 24 is such that an adequate contact of the gas with the liquid will be obtained without the necessity of such high gas velocities through the orifices thereof that blowing out of the liquid seal will occur. However, in view of the recirculation of the plate liquid along the edges of these bubble caps, as will be subsequently described, it is apparent that a smaller number of caps can be used than has been found necessary with trays of the prior art, and this is one of the advantages of the present invention.

By reason of the re-circulation of the liquid on the tray, it is possible to obtain adequate temperature regulation by the use of coils mounted directly upon the surface thereof. As is shown on Figs. 2 and 3 of the drawings, these coils 28 are mounted in the central zone of the tray adjacent the bubble caps and preferably surround the central bubble cap 13. When the tower is operated under a positive pressure as is frequently the case, the inlet and outlet pipes 29 and 30 are passed into the tower through stuffing boxes 31 to obtain a gas-tight connection. The coils are preferably arranged in a bank as shown in Fig. 3, and are retained in place by coil anchors 32 bolted to the plate surface through apertured bosses 60. By the passage of heating or cooling fluid through the coils, for example by the use of cold water or brine solution when cooling is desired, a highly efficient temperature regulation both of the liquid and of the gases is obtained.

The dams 14 are so constructed as to promote the circulation of liquid thereover from the rear to the front section of the tray. For this purpose they are formed with relatively short raised outer and inner ends 33 and 34, leaving depressed intermediate edges 35 which form wide central overflow weirs 35a and give each dam an effective height that is well below the level of the overflow outlet 15 and consequently below the liquid level of the plate, this level being indicated on Fig. 3 by the broken line 36. As shown in this figure, the outer ends 33 extend above the liquid level and are shaped to fit the tray surface and the tower wall to which they are attached. The raised inner ends 34 also reach above the level of the liquid and are notched as at 37 to form a tight fit with the blank sections 38 of the outer bubble caps 26.

Mounted adjacent the dams 14 and cooperating therewith to produce a re-circulation of the plate liquid are the impeller bubble caps 39. These caps are shown in perspective in Fig. 1 and in greater detail in Figs. 4 to 8 inclusive, and their assembly with the nozzles is shown in Fig. 9. As has been indicated, they are so constructed as to utilize and direct the expansive or kinetic energy of the gases rising through the tower for propelling a flow of liquid over the dams, and thereby to maintain a re-circulating current of liquid over the plate surface.

Each impeller cap consists of a gas receiving and dispersing dome section and a liquid conduit section. In the modification illustrated in the drawings sheet metal of welded construction is used, although it is obvious that the caps may be cast, rolled, forged or otherwise suitably fabricated. The gas receiving dome is made up of a top 40, ends 41 and 42 and front and rear walls 43 and 44. The cap has an overall length slightly greater than the weirs 35a, and the ends 41 are extended beyond the front wall 43 to fit against the raised ends 33 and 34 of the dam, thus leaving an open space 45 between the dam and the front wall of the bubble cap.

Spaced sets of holes 46 and 47 are bored in the top of the bubble cap for the reception of the threaded extensions 22 at the top of the supplemental riser nozzles 18, which nozzles are adapted to extend upwardly within the dome through the open bottom thereof. As is shown in Fig. 5 the ends and middle sections of the front and rear walls are cut away as at 48 and 49 to a height well below the liquid level on the plate, leaving intermediate skirts 50 and 51 in these sections projecting a substantial distance at each side of the plane of the holes 46 and 47. These skirts are provided with notches 52 similar to the notches 25 in the main bubble caps and for a similar purpose. When the cap is mounted in place the notched skirts 50 and 51 are therefore opposite the supplemental riser nozzles 18 and are adapted for the dissemination of gas therefrom into the liquid on the tray.

Welded or otherwise associated with the gas receiving dome formed by the top and upper portions of the side walls of the bubble cap are a plurality of open liquid conduits 53, which are preferably spaced from each other and are asymmetrically associated with the lower portion of said dome. Those conduits are preferably formed as inverted channel members having vertical side walls 54, flat tops 55 and open bottoms, the length of the side walls being equal to the length of the skirts 50 and 51. As is shown in Figs. 7 and 8, the channel members are preferably spot welded to each other at their lower front and rear corners 56 and also welded to the front and rear walls 43 and 44 of the gas receiving dome as at 57 to provide spaces 58 therebetween, which spaces are equal in width to the notches 52 in the skirts 50 and 51. The channel members preferably terminate flush with the front wall of the dome, but extend beyond the rear wall thereof a substantial distance as at 59 for a purpose which will be subsequently explained. Within the interior of the dome the spaces 58 are open to permit the passage of gas therethrough under the front and rear walls 43 and 44 and form restricted gas outlets from said dome between said conduits.

The operation of the bubble cap is as follows: the gas enters through the supplemental riser nozzles 18 into the gas receiving dome formed by the top and the side and end walls of the cap, and by its pressure depresses the level of the liquid therein below the cut away portions 48 and 49 of the front and rear walls and below the tops of the notches 52 in the skirts 50 and 51 until it can escape thereunder. By reason of the restricted orifices at these points, the gas is disseminated into the liquid surrounding the cap in a plurality of fine jets, and ascends to the surface in the form of a continuous stream or froth of extremely small bubbles. At the rear of the cap these bubbles are free to travel both vertically and longitudinally away from the wall 50 of the bubble cap, but at the front their progress is impeded by the dam 14 and they are forced to rise vertically along the face thereof. This continuous stream of rising gas bubbles completely fills the closed area between the dam and the bubble cap and spreads over the dam through the weir 35a to such an extent that a current of the plate liquid is forced through the liquid conduits 53 by the hydrostatic pressure of the liquid in the rear section of the plate. The buoying property of the gas in the bubbles causes this current of liquid to be in turn directed up and over the dam, and at the same time promotes an even more intimate contact of the gas and the liquid at these areas.

It will be noted that the upper layer of the liquid adjacent the rear wall 50 of the bubble cap is subjected to the elevating influence of the gas bubbles rising in this area, but that the lower layer of liquid along this face of the bubble cap is protected from this influence by the projecting ends 55 of the liquid conduits. By reason of the asymmetrical association of the conduits with the gas receiving dome, a differential of hydrostatic pressure between the front and rear ends of the conduits is accordingly set up whenever gas is passed into the dome, and a corresponding flow of liquid through the conduits is produced. The amount of this pressure differential is a direct function of the speed with which the gas escapes through the orifices 52 and 58. Accordingly, any variation of speed in the gases rising through the tower will immediately effect the speed of re-circulation of the liquid on the tray surfaces, and the absorption efficiency of the trays will be automatically adjusted thereby.

From the above description it will be seen that a tray is provided by the present invention having means thereon responsive to the passage of gas through the tray for initiating and maintaining a re-circulation of the absorbing liquid. The path of re-circulation of this liquid is over the dams 14, around the front ends of the outer bubble caps 24, and longitudinally of these caps into the rear mixing section of the plate. From this point the flowing liquid divides into two separate streams and mixes with any stagnant liquid that may have remained in this section, and the mixture is again drawn through the conduits 53 and passed over the dams 14 to begin another cycle of re-circulation. Suitable additions to this re-circulating liquid are preferably continuously made through the inlet pipe 17, and corresponding portions thereof are continuously withdrawn through the overflow pipe 15 so that a substantially uniform concentration is maintained on the tray throughout its entire extent. Similarly, a uniform temperature is maintained by the passage of the tray liquid through a large proportion of its re-circulation along the heating or cooling coils 28 the liquid so modified in temperature being immediately mixed in the rear section of the tray with other liquid and correspondingly modifying its temperature in like manner.

While the invention has been described and illustrated in conjunction with a specific modification thereof it is understood that its broader principles and objects may be embodied in other equivalent modifications falling within the scope of the appended claims.

I claim:

1. A method of effecting contact between a flowing stream of gas and a body of liquid which comprises re-circulating a current of the liquid over a horizontal surface in a closed circuit by the action of kinetic energy of a portion of the gas, another portion of the gas being passed in intimate contact with the liquid at selected areas in its path of re-circulation.

2. A method of effecting contact between a flowing stream of gas and a body of liquid which comprises feeding liquid onto a horizontal surface, causing recirculation of the liquid over said surface in a closed circuit by the action of a portion of kinetic energy of the gas while passing another portion of the gas in intimate contact with the liquid at selected areas in its path of recirculation, withdrawing liquid from the circuit and flowing it onto further horizontal surfaces in a recirculating stream in contact with earlier portions of the flowing gas stream.

3. A method of effecting contact between a flowing stream of gas and a body of liquid and simultaneously regulating the temperature thereof which comprises re-circulating a current of the liquid over a horizontal surface in a closed circuit by the kinetic energy of a portion of the gas, passing a temperature regulating medium in heat exchanging relation with the liquid in said circuit, and passing another portion of the gas in intimate contact with the liquid at selected areas in its path of re-circulation.

4. In a gas and liquid contact apparatus a level tray having means for retaining thereon a body of liquid at a substantially uniform depth, risers and bubble caps mounted in selected areas of said tray, temperature regulating elements mounted on said tray, and means for maintaining in a liquid a re-circulating current that moves in a closed circuit and includes said bubble caps and said temperature regulating elements in its path.

5. A gas and liquid contact apparatus comprising a vertical container for the passage of gas, a horizontal tray supported in said container, main risers covered by bubble caps on said tray, means for feeding liquid to the surface of said tray, supplemental risers on said tray and means on said tray responsive to the passage of a portion of the gas through said supplemental risers for recirculating a current of liquid over the surface of said tray in a path which describes more than one complete circuit.

6. A gas and liquid contact apparatus comprising a shell and a plurality of horizontal trays mounted therein, each tray having means for retaining thereon a single layer of liquid at a substantially uniform depth throughout, gas risers covered by bubble caps in the central zone of each tray, dams extending from said central zone to the periphery of the tray and having upper edges below the liquid level, and means for causing a re-circulation of the liquid in closed paths extending over said dams and through said central zone.

7. A gas and liquid contact apparatus comprising a shell and a plurality of horizontal trays mounted therein, each tray having means for retaining thereon a single layer of liquid at a substantially uniform depth throughout, gas risers covered by bubble caps in the central zone of each tray, temperature regulating elements mounted between said bubble caps, dams extending from said central zone to the periphery of the tray and having upper edges below the liquid level, and means actuated by the movement of gas in said shell for maintaining a re-circulation of the liquid in closed paths extending over said dams and through said central zone.

8. A gas and liquid contact apparatus comprising a shell and a plurality of horizontal trays mounted therein, gas risers covered by parallel elongated bubble caps in the central zone of each tray, aligned dams extending outwardly from the central zone and dividing the tray into front and rear sections, a liquid inlet and a liquid overflow outlet in the front section, the overflow level being higher than the effective height of the dams, and means in the rear section for propelling liquid over said dams from the rear to the front section.

9. A tray for a gas and liquid contact apparatus having a plurality of gas risers covered by parallel elongated bubble caps in the central zone thereof, a temperature regulating coil in said central zone adjacent the bubble caps, aligned dams extending outwardly from the central zone at right angles to said bubble caps and dividing the tray into front and rear sections, a liquid inlet and a liquid overflow outlet in the front section, the overflow outlet level being higher than the effective height of the dams, supplemental gas risers in the rear section adjacent each dam, and means associated with said supplemental risers for causing a flow of liquid over said dams into the front section upon passage of gas through said risers.

10. A tray for a gas and liquid contact apparatus having a plurality of gas risers covered by parallel elongated bubble caps in the central zone thereof, a temperature regulating coil in said central zone adjacent the bubble caps, aligned dams extending outwardly from the central zone at right angles to said bubble caps and dividing the tray into front and rear sections, the front section containing a liquid inlet and a liquid overflow outlet having a level higher than the effective height of the dams, supplemental gas risers in the rear section adjacent each dam and impeller bubble caps covering said supplemental risers, each impeller cap consisting of a gas receiving dome having a plurality of spaced inverted channel members attached to the lower portions thereof, said channel members terminating at the edge of said dome on the side nearest the dam but extending beyond its opposite face.

11. In a plate for a gas and liquid contact apparatus, means forming a recirculating path for liquid thereon, said path including a dam, and means responsive to the flow of gas through said plate for causing a flow of liquid over said dam.

12. A plate for a gas and liquid contact apparatus including, in combination, a dam, a bubble cap adjacent said dam, and means associated with said bubble cap for causing a flow of liquid over said dam upon passage of gas through said bubble cap.

13. In a gas and liquid contact apparatus of the bubble type a plate, a dam extending only partially across said plate, and means associated with said dam for causing a flow of liquid over said dam upon passage of gas through said plate, said means including a bubble cap consisting of a gas receiving dome, a plurality of open conduits asymmetrically associated with the lower portion of said dome, and restricted gas outlets from said dome between said conduits.

14. An impeller bubble cap comprising a gas receiving dome, an open horizontal liquid conduit passing through said dome but not in communication therewith, and means including a gas outlet from said dome for causing a flow of liquid through said conduit.

15. An impeller bubble cap comprising a gas receiving dome, a plurality of open liquid conduits asymmetrically associated with the lower portion of said dome, and restricted gas outlets from said dome between said conduits.

16. An impeller bubble cap comprising a gas receiving dome and a plurality of spaced, inverted channel members asymmetrically attached to said dome at the lower edges thereof and forming liquid conduits extending therethrough, and means for supplying gas to the interior of said dome.

17. In a liquid supporting tray for a gas and liquid contact apparatus of the bubble type a device for producing movement of said liquid over the surface thereof comprising in combination a riser nozzle, a gas receiving dome covering said riser nozzle and having front and rear walls, notched skirts in said walls opposite said riser nozzle and a plurality of spaced, inverted channel members attached to the lower edges of said walls on both sides of said skirts, said channel members terminating at the outer surface of one wall but extending beyond the surface of the other.

18. A method according to claim 3 in which the temperature regulating medium is a cooling medium.

19. A method according to claim 3 in which the temperature regulating medium is a heating medium.

CARL E. MENSING.